United States Patent [19]

Kossmehl et al.

[11] Patent Number: 5,214,452

[45] Date of Patent: May 25, 1993

[54] HYDROGELS BASED ON FLUORINE-CONTAINING AND SACCHARIDE MONOMERS

[75] Inventors: Gerhard Kossmehl, Berlin-Lichterfelde; Horst Schafer, Aschaffenburg; Norbert Klaus, Berlin; Jürgen Volkheimer, Wiesbaden; Madjid Rezaii-Djafari, Berlin, all of Fed. Rep. of Germany

[73] Assignee: Ciba-Geigy Corporation, New York, N.Y.

[21] Appl. No.: 916,047

[22] Filed: Jul. 17, 1992

Related U.S. Application Data

[63] Continuation of Ser. No. 704,653, May 20, 1991, Pat. No. 5,155,194, which is a continuation of Ser. No. 450,712, Dec. 14, 1989, abandoned.

[30] Foreign Application Priority Data

Dec. 19, 1988 [CH] Switzerland .................. 3842752

[51] Int. Cl.⁵ .............................. G02C 7/04
[52] U.S. Cl. .............................. 351/160 R
[58] Field of Search ....................... 351/160 R

[56] References Cited

U.S. PATENT DOCUMENTS

| | | | |
|---|---|---|---|
| 3,654,244 | 4/1972 | Pittman et al. | 260/79.7 |
| 3,808,179 | 4/1974 | Gaylord et al. | 260/86.1 |
| 3,988,274 | 10/1976 | Masuhara et al. | 260/29.7 |
| 4,130,706 | 12/1978 | Plambeck, Jr. et al. | 526/245 |
| 4,451,629 | 5/1984 | Taneka et al. | 526/238.23 |
| 4,686,267 | 8/1987 | Ellis et al. | 526/345 |
| 4,996,275 | 2/1991 | Ellis et al. | 526/245 |

FOREIGN PATENT DOCUMENTS

| | | |
|---|---|---|
| 0100381 | 2/1984 | European Pat. Off. . |
| 0219312A3 | 4/1987 | European Pat. Off. . |
| 61-126052 | 6/1986 | Japan . |
| 62-205109 | 9/1987 | Japan . |
| 2097952A | 4/1982 | United Kingdom . |
| 88/05060 | 7/1988 | World Int. Prop. O. . |

OTHER PUBLICATIONS

Chemical Abstract 112, 21633e (Same as U.S. Pat. No. 4,686,267 above).
Chemical Abstract 111, 78691f (same as U.S. Pat. No. 4,996,275 above).

*Primary Examiner*—Joseph L. Schofer
*Assistant Examiner*—N. Sarafim
*Attorney, Agent, or Firm*—Edward McC. Roberts; William G. Hervey

[57] ABSTRACT

The invention relates to a hydrogel which is a copolymer of a polymerizable monomer mixture which contains a) 2-85 mol-% of a hydrophobic vinyl monomer with at least three fluorine atoms, b) 2-80 mol-% of a hydrophobic polyhydroxy vinyl monomer whose hydroxyl groups are in protected form, c) 2-70 mol-% of a hydrophilic vinyl monomer and, d) based on the total amount of monomers a)-c), 0-5 mol-% of a crosslinker, in which hydrogel the hydroxyl groups of the segments formed by the monomers b) are in protected or in free form.

These hydrogels can be used, for example, as contact lenses, intraocular lenses or in other areas of application where biologically tolerated materials are required.

3 Claims, No Drawings

HYDROGELS BASED ON FLUORINE-CONTAINING AND SACCHARIDE MONOMERS

This is a continuation of Ser. No. 07/704,653 filed May 20, 1991, now U.S. Pat. No. 5,155,194 which is a continuation of Ser. No. 07/450,712 filed Dec. 14, 1989 now abandoned.

The present invention relates to novel hydrogels, processes for the preparation thereof, uses of the hydrogels, for example as contact lenses, intraocular lenses or in other areas of application where biologically tolerated materials are required, as well as abovementioned articles consisting essentially of the novel hydrogels. The novel hydrogels are distinguished by particular advantages relating to, for example, oxygen permeability, water content and mechanical stability.

It is known that hydrogels (crosslinked polymers with a limited swellability in water) have an oxygen permeability which depends on the water content. It increases with increasing water content. It is furthermore known that polymers which contain fluorine-containing structural units and those having a structure based on polysiloxanes are distinguished by particularly high oxygen permeabilities. However, the water content of polymers which consist entirely or predominantly of the two last-mentioned groups of substances is low. The basically desired high oxygen permeability is normally achieved in the known polymers at the expense of other serious disadvantages. Thus, hydrogels with a high water content normally have a low mechanical stability such as, for example, tear strength. Polymers composed of silicones or fluorine-containing materials are highly hydrophobic and, correspondingly, poorly suited for use as, for example, contact lenses.

The present invention provides a remedy for this by disclosing hydrogels which, owing to an appropriate choice of materials, have an extremely beneficial combination of properties. In particular, the oxygen permeability can be influenced both by controlling the fluorine content and by controlling the water content, independently of one another.

The invention relates to a hydrogel which is a copolymer of a polymerizable monomer mixture which contains a) 2–85 mol-% of a hydrophobic vinyl monomer with at least three fluorine atoms,
b) 2–80 mol-% of a hydrophobic polyhydroxy vinyl monomer whose hydroxyl groups are in protected form,
c) 2–70 mol-% of a hydrophilic vinyl monomer and,
d) based on the total amount of the monomers a)–c), 0–5 mol-% of a crosslinker, in which hydrogel the hydroxyl groups of the segments formed by the monomers b) are in protected or in free form.

The hydrophobic vinyl monomer with at least 3 fluorine atoms a) is, in particular, selected from the compounds of the formula I

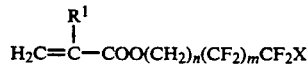

in which $R^1$ is hydrogen or methyl, n is a number from 1 to 4, m is a number from 0 to 19, X is hydrogen or fluorine; with the proviso that X is fluorine when m is 0; as well as from hexafluoroisopropyl acrylate, hexafluoroisopropyl methacrylate and 2,3,4,5,6-pentafluorostyrene. It is possible to use as monomer a) one of the monomers defined above or a mixture of several of these monomers.

The proportion of vinyl monomer a) in the monomer mixture is preferably 10–80 mol-%, particularly preferably 20–60 mol-%, and in a special embodiment 30 mol-%.

Preferred monomers of the formula I are those in which $R^1$ is methyl, n is 1 or 2, m is 1 to 4 and X is fluorine.

Examples of fluorine-containing monomers of the formula I are 2,2,3,3,4,4,4-heptafluorobutyl acrylate and methacrylate (also called heptafluoropropyl-methyl acrylate and methacrylate respectively), nonafluorobutyl-methyl and -ethyl acrylate and methacrylate, $C_6F_{13}$-methyl and -ethyl acrylate and methacrylate, $C_8F_{17}$- and $C_{10}F_{21}$-methyl and -ethyl acrylate and methacrylate. 2,2,3,3,4,4,4-Heptafluorobutyl methacrylate ($F_7BuMA$) is particularly preferred.

The polyhydroxy vinyl monomer b) whose hydroxyl groups are in protected form is a vinyl monomer which is derived from a saccharide or a sugar alcohol. It has, in particular, either formula II

in which $R^1$ is hydrogen or methyl, and $R^2$ is a saccharide residue whose hydroxyl groups are in protected form, or formula III

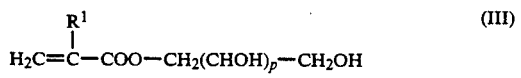

in which $R^1$ is hydrogen or methyl, p is a number from 1 to 8, and in which the hydroxyl groups are in protected form. It is possible to use as monomer b) one of the monomers defined above or a mixture of several of these monomers.

The proportion of the vinyl monomers b) in the monomer mixture is preferably 10–70 mol-%, particularly preferably 20–60 mol-%, and in a special embodiment 30 mol-%.

The saccharide residues $R^2$ in the vinyl monomers of the formula II are preferably residues of monosaccharides which have 4 to 6 carbon atoms and whose hydroxyl groups are in protected form. Examples of monosaccharides of this type are erythrose, threose, arabinose, ribose, xylose, glucose, mannose, galactose, fructose and sorbose. The configuration of these saccharide residues, for example as furanoside or as pyranoside, is immaterial in this connection.

In the case of the vinyl monomer of the formula III which is derived from a sugar alcohol and in which the hydroxyl groups are in protected form, p is preferably a number from 2 to 4. This formula also embraces all conceivable positional isomers. Examples of sugar alcohols from which compounds of the formula III are derived are xylitol, adonitol, arabitol, sorbitol, mannitol or dulcitol.

The hydroxyl groups of the compounds of the formula II and III, which are in protected form, are preferably protected in pairs as acid-labile ketals, for example and preferably as addition products with a ketone. Two hydroxyl groups which are together protected as a ketal are, for example, protected together by means of a preferably substituted methylene group, such as by lower alkylidene, for example isopropylidene, cycloalkylidene, for example cyclohexylidene, or benzylidene.

Particularly preferred representatives of the vinyl monomers of the formula II are 3-O-acryloyl-1,2;5,6-di-O-isopropylidene-α-D-(—)-glucofuranose (3-ADPGlu) of the formula IIa (R¹=H),

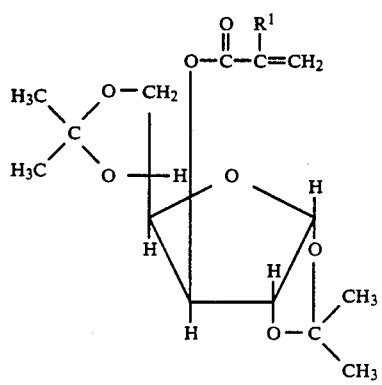

1-O-methacryloyl-2,3;4,5-di-O-isopropylidene-β-D-(—)-fructopyranose (1-MDPFru) of the formula IIb (R¹=methyl) and 1-O-acryloyl-2,3;4,5-di-O-isopropylidene-β-D-(—)-fructopyranose (1-ADPFru) of the formula IIb (R¹=H),

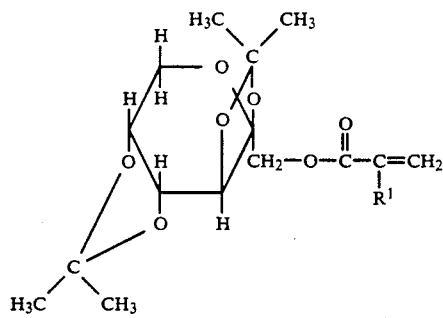

3-O-methacryloyl-di-O-isopropylidene-β-D-fructopyranose (3-MDPFru) (isomer of IIb with R¹=methyl), 3-O-acryloyl-di-O-isopropylidene-β-D-fructopyranose (3-ADPFru) (isomer of IIb with R¹=H) as well as 1-O-methacryloyl-2,3;4,6-di-O-isopropylidene-α-L-(—)-sorbofuranose (1-MDPSorb) of the formula IIc (R¹=methyl) and 1-O-acryloyl-2,3;4,6-di-O-isopropylidene-α-L-(—)-sorbofuranose (1-ADPSorb) of the formula IIc (R¹=H)

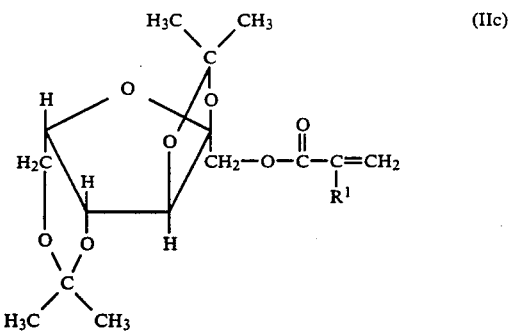

Particularly preferred representatives of the vinyl monomers of the formula III are 5-O-methacryloyl-1,2;3,4-di-O-isopropylidene-DL-xylitol (5-MDPXy) (R¹=methyl) and 5-O-acryloyl-1,2;3,4-di-O-isopropylidene-DL-xylitol (5-ADPXy) (R¹=H) of the formula IIIa

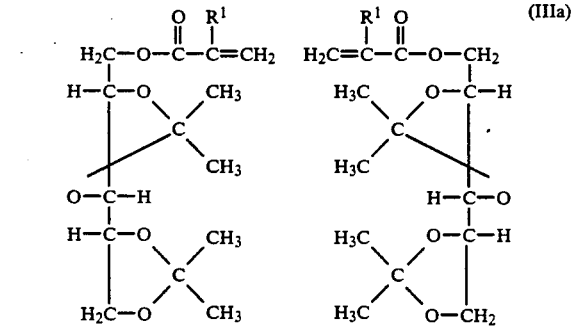

The hydrophilic vinyl monomers c) which can be used according to the invention are preferably acrylates and methacrylates of the formula:

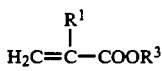

in which R¹ is hydrogen or methyl, and R³ is a hydrocarbon radical which has 1 to 10 carbon atoms and is substituted one or more times by a group which confers solubility in water, such as carboxyl, hydroxyl or tert-amino, for example tert-lower-alkylamino with 1 to 7 carbon atoms per lower alkyl group, a polyethylene oxide group with 2–100 repeating units, preferably with 2–40 repeating units, or by a sulfate, phosphate, sulfonate or phosphonate group, such as, for example, an appropriately substituted alkyl, cycloalkyl or phenyl radical or a combination of such radicals, such as phenylalkyl or alkylcycloalkyl, as well as from acrylamides and methacrylamides of the formula

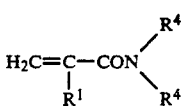

in which R⁴ is hydrogen or C₁-C₄alkyl; acrylamides and methacrylamides of the formula

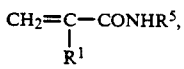

in which $R^5$ has the meaning of $R^3$ or $R^4$; maleates and fumarates of the formula

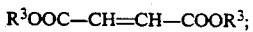

crotonates of the formula

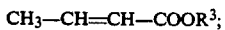

vinyl ethers of the formula

vinyl-substituted five- or six-membered heterocycles with one or two nitrogen atoms as well as N-vinyllactams, such as N-vinyl-2-pyrrolidone, and carboxylic acids with vinyl unsaturation and a total of 3 to 10 carbon atoms, such as methacrylic acid, crotonic acid, fumaric acid or cinnamic acid.

Preferred examples are hydroxyl-substituted $C_2$-$C_4$alkyl (meth)acrylates, five- to seven-membered N-vinyllactams, N,N-di-$C_1$-$C_4$alkyl(meth)acrylamides and carboxylic acids with vinyl unsaturation and a total of 3 to 5 carbon atoms.

The proportion of the vinyl monomer c) in the monomer mixture is preferably 10–60 mol-% and particularly preferably 20–40 mol-%. It is also possible to use from the monomers c) one of the monomers defined above, or a mixture of several of these monomers.

The water-soluble monomers which can be used include: 2-hydroxyethyl, 2- and 3-hydroxypropyl, 2,3-dihydroxypropyl, polyethoxyethyl and polyethoxypropyl acrylates and methacrylates as well as the corresponding acrylamides and methacrylamides, acrylamide and methacrylamide, N-methylacrylamide and -methacrylamide, bisacetoneacrylamide, 2-hydroxyethylacrylamide, dimethylacrylamide and -methyacrylamide as well as methylolacrylamide and -methacrylamide, N,N-dimethyl- and N,N-diethylaminoethyl acrylate and methacrylate as well as the corresponding acrylamides and methacrylamides, N-tert-butylaminoethyl methacrylate and -methacrylamide, 2- and 4-vinylpyridine, 4- and 2-methyl-5-vinylpyridine, N-methyl-4-vinylpiperidine, 1-vinyl- and 2-methyl-1-vinylimidazole, dimethylallylamine and methyldiallylamine as well as para- and orthoaminostyrene, dimethylaminoethyl vinyl ether, N-vinylpyrrolidone and 2-pyrrolidinoethyl methacrylate, acrylic and methacrylic acid, itaconic acid, cinnamic acid, crotonic acid, fumaric acid, maleic acid and their hydroxy-lower-alkyl mono- and diesters such as 2-hydroxyethyl and di-(2-hydroxy)-ethyl fumarate, maleate and itaconate, as well as 3-hydroxypropyl butyl fumarate and di-polyalkoxyalky fumarates, maleates and itaconates, maleic anhydride, sodium acrylate and methacrylate, 2-methacryloyloxyethylsulfonic acid, 2-acrylamido-2-methylpropanesulfonic acid, 2-phosphatoethyl methacrylate, vinylsulfonic acid, sodium vinylsulfonate, p-styrenesulfonic acid, sodium p-styrenesulfonate and allylsulfonic acid, N-vinylpyrrolidone, N-vinylcaprolactam, as well as the quaternized derivatives of cationic monomers which are obtained by quaternization with selected alkylating agents, for example halogenated hydrocarbons such as methyl iodide, benzyl chloride or hexadecyl chloride, epoxides such as glycidol, epichlorohydrin or ethylene oxide, acrylic acid, dimethyl sulfate, methyl sulfate and propane sultone.

A more complete list of water-soluble monomers which can be used in connection with the invention is to be found in: R. H. Yocum and E. B. Nyquist, Functional Monomers, volume 1, pages 424–440 (M. Dekker, N.Y. 1973).

Preferred monomers are 2-hydroxyethyl methacrylate, N-vinyl-2-pyrrolidone, N,N-dimethylacrylamide as well as acrylic and methacrylic acid.

Crosslinkers d) are, in particular, diolefinic monomers, for example allyl acrylate and methacrylate, diacrylates and dimethacrylates of ethylene glycol, diethylene glycol, triethylene glycol, tetraethylene glycol and, in general, polyethylene oxide glycol, diacrylates and dimethacrylates of 1,4-butanediol and poly-n-butylene oxide glycol, diacrylates and dimethacrylates of propylene glycol and polypropylene oxide glycol, thiodiethylene glycol diacrylate and dimethacrylate, di-(2-hydroxyethyl) sulfone diacrylate and dimethacrylate, neopentyl glycol diacrylate and dimethacrylate, trimethylolpropane tri- and tetraacrylate, pentaerythritol tri- and tetraacrylate, divinylbenzene, divinyl ether, divinyl sulfone, disiloxanyl-bis-3-hydroxypropyl diacrylate or methacrylate and related compounds. Ethylene glycol dimethacrylate is preferred.

The crosslinker is, when present, preferably added in amounts of 0.01–1 mol-%, particularly preferably in the amount of 0.2 mol-%, in each case based on the total amount of monomers a) to c).

The hydrogels according to the invention are generated by radical copolymerization either in bulk or in the presence of small amounts of solvent. The polymerization is expediently carried out at elevated temperature, preferably in the presence of an initiator forming free radicals, for example at a temperature in the range from about 30° C. to about 105° C. These initiators are preferably peroxides or azo catalysts with a half-life of at least 20 minutes at the polymerization temperature. Typical examples of peroxy compounds which can be used are isopropyl percarbonate, tert-butyl peroctoate, benzoyl peroxide, lauroyl peroxide, decanoyl peroxide, acetyl peroxide, succinic acid peroxide, methyl ethyl ketone peroxide, tert-butyl peroxyacetate, propionyl peroxide, 2,4-dichlorobenzoyl peroxide, tert-butyl peroxypivalate, pelargonyl peroxide, 2,5-dimethyl-2,5-bis-(2-ethylhexanoylperoxy)-hexane, p-chlorobenzoyl peroxide, tert-butyl peroxybutyrate, tert-butylperoxymaleic acid, tert-butylperoxyisopropyl carbonate and bis-(1-hydroxycyclohexyl)-peroxide.

Azo compounds include 2,2-azo-bis-isobutyronitrile, 2,2'-azo-bis-(2,4-dimethylvaleronitrile), 1,1'-azo-bis-(cyclohexanecarbonitrile) and 2,2'-azo-bis-(2,4-dimethyl-4-methoxyvaleronitrile).

It is also possible in this connection to use other mechanisms forming free radicals, such as radiation with, for example, X-rays, electron beams and UV radiation.

The amount of initiator can vary between 0.002 and 1 mol-% based on components a) to d), but is preferably 0.03 to 0.3 mol-%.

The monomers to be polymerized are expediently purified before the polymerization, in particular to remove inhibitors with which they are stabilized. Thus, for example, they are washed with suitable dilute aqueous bases such as alkali metal hydroxides, for example sodium hydroxide solution, and purified by distillation under mild temperature conditions.

The polymerization mixtures are polymerized on the laboratory scale in a manner known per se, for example in a cylinder mould, by subjecting them in plastic syringes to a temperature programme in which the temperature is raised stepwise from 30° C. to about 100° C. The steps in temperature can, for example, be between 5° and 10° C., remaining at each temperature for 1 to 5 hours. Two-hour intervals are customary, but it is also possible to maintain individual temperatures for up to 20 hours. Normally, conditioning is carried out at temperatures around 100° C. for 5 to 20 hours at the end.

In order to obtain hydrogels according to the invention, the copolymers obtainable as described above must be hydrated. This is expediently carried out by storage in aqueous buffered sodium chloride solution, which is preferably isotonic. The polymers are normally cut into thin discs before the hydration.

The hydroxyl groups present in the segments formed by the vinyl monomers b) in the hydrogels described above are still in protected form, for example as isopropylidene ketals. The hydrogels are therefore still relatively strongly hydrophobic. They can be converted into hydrogels according to the invention, which contain the hydroxyl groups present in the segments formed by the vinyl monomers b) in free form, by eliminating the protective groups. This can be carried out by introduction into an acid medium, as is generally known for acetal cleavages, for example according to GB 2091750 (Tanaka et al.).

The elimination of protective groups makes the segments formed by the vinyl monomers b) hydrophilic or highly hydrophilic. It is possible in this way to increase distinctly the ability of the hydrogels to absorb water. Even after the polymerization the oxygen permeability can be influenced in this way, with the content of fluorine-containing monomers and other constituents remaining the same. The hydrogels according to the invention therefore have the advantage that the oxygen permeability can be controlled by two measures which are independent of one another: the content of vinyl monomers a) on the one hand, and the hydrolysis of the hydroxyl protective groups on the vinyl monomer b) on the other hand.

Another surprising aspect of the invention is that hydrophilic monomers c) yield, with the hydrophobic monomers a) and the saccharide or sugar alcohol monomers, polymers which in fact have no phase separation either in the unswollen or in the swollen state (hydrogel) and thus are optically clear. This is possible because the monomers a) form, with the saccharide monomers which have been rendered hydrophobic by, for example, isopropylidene protective groups and which are highly hydrophilic without corresponding protective groups, a clear solution which is able to take up the hydrophilic monomers c).

The hydrogels according to the invention have very good oxygen permeabilities and, at the same time, are hydrophilic and, in addition, mechanically stable, i.e. they have, for example, a high tear strength. They are therefore excellently suited as materials for contact lenses or intraocular lenses as well as other biologically tolerated materials, for example implants, eye bandages, transdermal systems or other forms of medicament carriers.

Contact lenses can be produced from the said hydrogels in a manner known per se. For this purpose, the mixtures to be polymerized are polymerized, for example, in a cylindrical mould and, after removal from the mould, the resulting rods are divided into discs or buttons which can be further processed mechanically. Alternatively, the polymerization can also be carried out in lens moulds so that the polymers are obtained directly as lens blanks.

The reaction is preferably carried out under an inert atmosphere when it takes place in open moulds. It is known that oxygen inhibits the polymerization and results in increased polymerization times. If closed moulds are used to form the polymer, the moulds are composed of inert materials with low oxygen permeability and non-stick properties. Examples of suitable mould materials are polytetrafluoroethylene, such as Teflon ®, silicone rubber, polyethylene, polypropylene and polyesters such as Mylar ®. When a suitable release agent is employed, it is also possible to use moulds made of glass and metal.

The monomers which are used are known, some of them can be booughт, or they can be prepared by processes known per se.

The examples which follow explain the subject-matter of the invention but without restricting it to the scope of the examples, for instance. When amounts are stated, percentages are molar percentages unless expressly stated otherwise. Temperatures are stated in degrees Celsius.

The abbreviations which are used have the following meanings:

| | |
|---|---|
| AIBN | azoisobutyronitrile |
| EGDM | ethylene glycol dimethacrylate |
| F$_7$BuMA | heptafluoropropyl-methyl methacrylate |
| HEMA | 2-hydroxyethyl methacrylate |
| VP | vinylpyrrolidone |

With regard to the abbreviations for the monomers b) which are used, reference may be made to the explanations in connection with formulae II and III.

General information:

F$_7$BuMA (Ventron GmbH)-stabilized with hydroquinone-VP (Fluka)-stabilized with N,N'-di-sec-butyl-p-phenylenediamine-and HEMA (Röhm GmbH)-stabilized with hydroquinone and hydroquinone monomethyl ether-are freed of inhibitors by the relevant monomer (100 ml amounts) being washed with 3×100 ml of 5% sodium hydroxide solution and 1×100 ml of water, dried over Na$_2$SO$_4$ and then distilled free of inhibitor while avoiding overheating due to the heating bath. The cloudy fore-run (about 10 ml) is discarded. In the case of HEMA the EGDM content in the initial monomer determined by gas chromatography (a mean of 0.14 mol-%) is taken into account. 1-MDPFru, 1-ADPFru and 1-MDPSorb are available only as syrup, not in crystalline form. Because of their high viscosity at room temperature, it is impossible to carry out weighings as accurately as necessary; for this reason these monomers are weighed at 50° C., in which case the measurement error can be reduced to below 1 mg. Because there is a risk of polymerization at 50° C., the syrupy inhibitor-free monomers are heated in amounts of about 4 g in 10 ml flasks on a hot plate at 50° C. and directly weighed into a 25 ml Erlenmeyer flask.

EXAMPLE 1

4.555 g of HEMA, 4.683 g of F$_7$BuMA, 1.749 g of 5-MDPXy, 13.4 mg of EGDM and, finally, 5.5 mg of AIBN are weighed into a 25 ml Erlenmeyer flask. The polymerization mixture is then stirred at 20° C. for 1 hour until all the crystals in the mixture have completely dissolved. Once a homogeneous liquid mixture has been produced, it is introduced into 10 ml plastic syringes (from Henke-Sass Wolf, Tuttlingen, material: polyethylene and polypropylene, melting point about 140° C., internal diameter: 16 mm). The air is forced out, the syringe nozzles are sealed by melting, and the pistons are secured by a wire. The syringes sealed in this way are placed in a waterbath taking care that the surface of the water is always at a higher level than the surface of the monomer mixture in the syringe. Polymerization is now carried out for 2 hours each at 30° C., 40° C., 50° C., 60° C. and 70° C. The post-polymerization of the syringes with their solid contents is then carried out in a drying oven at 80° C. for 2 hours and then at 90° C. for 5 hours. The resulting polymers are removed from the syringes and conditioned at 90° C. for 8 hours. A cylindrical hard polymer is obtained. The polymer sample is crystal clear and colourless.

EXAMPLE 2-13

Clear colourless polymers with the compositions indicated in Table 1a are obtained in an analogous manner.

TABLE 1a

Composition of polymer samples 1-13

| Sample No. | F$_7$BuMa mol % | g | mol % | g | HEMA mol % | g | EGDM mol % | g | AIBN mg |
|---|---|---|---|---|---|---|---|---|---|
| | | | 5-MDPXy | | | | | | |
| 1 | 30 | 4.683 | 10 | 1.749 | 60 | 4.555 | 0.2 | 0.0134 | 5.5 |
| 2 | 30 | 4.296 | 20 | 3.208 | 50 | 3.483 | 0.2 | 0.0138 | 5.5 |
| 3 | 30 | 3.968 | 30 | 4.445 | 40 | 2.573 | 0.2 | 0.0141 | 5.5 |
| 4 | 30 | 3.687 | 40 | 5.506 | 30 | 1.793 | 0.2 | 0.0144 | 5.5 |
| 5 | 30 | 3.442 | 50 | 6.427 | 20 | 1.116 | 0.2 | 0.0146 | 5.5 |
| 6 | 30 | 3.229 | 60 | 7.233 | 10 | 0.524 | 0.2 | 0.0148 | 5.5 |
| 7 | 30 | 3.040 | 70 | 7.945 | 0 | | 0.2 | 0.0150 | 5.5 |
| | | | 5-ADPXy | | | | | | |
| 8 | 30 | 2.941 | 30 | 3.141 | 40 | 1.908 | 0.2 | 0.0104 | 4.0 |
| | | | 3-ADPGlu | | | | | | |
| 9 | 30 | 2.833 | 30 | 3.321 | 40 | 1.837 | 0.2 | 0.0101 | 4.0 |
| | | | 1-MDPFru | | | | | | |
| 10 | 30 | 2.781 | 30 | 3.406 | 40 | 1.804 | 0.2 | 0.0099 | 4.0 |
| | | | 1-ADPFru | | | | | | |
| 11 | 30 | 2.833 | 30 | 3.321 | 40 | 1.837 | 0.2 | 0.0101 | 4.0 |
| | | | 1-MDPSorb | | | | | | |
| 12 | 30 | 2.781 | 30 | 3.406 | 40 | 1.804 | 0.2 | 0.0099 | 4.0 |
| | | | 1-ADPSorb | | | | | | |
| 13 | 30 | 2.833 | 30 | 3.321 | 40 | 1.837 | 0.2 | 0.0101 | 4.0 |

EXAMPLES 14-36

Bubble-free, clear, colourless polymers with the compositions indicated in Table 1b are obtained in a manner analogous to Example 1, although the following temperature programme is used, unlike Example 1:

Polymerization for 15 hours at 30° C., for 2 hours each at 40° C., 50° C., 60° C., for 12 hours at 65° C., for 2 hours at 70° C., for 2 hours at 80° C., for 12 hours at 85° C., for 8 hours at 90° C. and for 12 hours at 98° C. After the resulting polymers have been removed from the syringes, conditioning at 98° C. is carried out for 12 hours.

TABLE 1b

Composition of polymer samples 14-36

| Sample No. | F$_7$BuMa mol % | g | Monosaccharide mol % | g | HEMA/VP mol % | g | EGDM mol % | g |
|---|---|---|---|---|---|---|---|---|
| | | | 5-MDPXy | | HEMA | | | |
| 14 | 10 | 1.1193 | 70 | 8.777 | 20 | 1.0894 | 0.2 | 0.01374 |
| 15 | 20 | 2.266 | 60 | 7.614 | 20 | 1.103 | 0.2 | 0.01391 |
| 16 | 40 | 4.648 | 40 | 5.207 | 20 | 1.136 | 0.2 | 0.01426 |
| 17 | 50 | 5.885 | 30 | 3.955 | 20 | 1.145 | 0.2 | 0.01444 |
| 18 | 60 | 7.154 | 20 | 2.671 | 20 | 1.160 | 0.2 | 0.01463 |
| 19 | 70 | 8.459 | 10 | 1.353 | 20 | 1.175 | 0.2 | 0.01483 |
| 20 | 80 | 9.793 | 0 | 0.00 | 20 | 1.191 | 0.2 | 0.01502 |
| | | | 1-MDPFru | | | | | |
| 21 | 10 | 1.042 | 70 | 8.931 | 20 | 1.0140 | 0.2 | 0.01245 |
| 22 | 20 | 2.128 | 60 | 7.818 | 20 | 1.039 | 0.2 | 0.01306 |
| 23 | 40 | 4.452 | 40 | 5.452 | 20 | 1.084 | 0.2 | 0.01365 |
| 24 | 50 | 5.695 | 30 | 4.184 | 20 | 1.108 | 0.2 | 0.01397 |
| 25 | 60 | 6.995 | 20 | 2.855 | 20 | 1.135 | 0.2 | 0.01431 |
| 26 | 70 | 8.3604 | 10 | 1.463 | 20 | 1.162 | 0.2 | 0.01466 |
| 27 | 80 | 9.793 | 0 | 0.00 | 20 | 1.191 | 0.2 | 0.01502 |
| | | | 3-MDPFru | | VP | | | |
| 28 | 20 | 2.1621 | 60 | 7.9309 | 20 | 0.896 | 0.2 | 0.013140 |
| 29 | 30 | 3.3134 | 50 | 6.758 | 20 | 0.916 | 0.2 | 0.01632 |
| 30 | 40 | 4.5164 | 40 | 5.5311 | 20 | 0.9360 | 0.2 | 0.01669 |
| 31 | 50 | 5.7784 | 30 | 4.2461 | 20 | 0.9671 | 0.2 | 0.01709 |

TABLE 1b-continued

| Sample No. | F7BuMa | | Monosaccharide | | HEMA/VP | | EGDM | |
|---|---|---|---|---|---|---|---|---|
| | mol % | g | mol % | g | mol % | g | mol % | g |
| 32 | 60 | 7.1029 | 20 | 2.8991 | 20 | 0.9813 | 0.2 | 0.017501 |
| 33 | 70 | 8.4911 | 10 | 1.4857 | 20 | 1.0056 | 0.2 | 0.017934 |
| | | | 3-ADPFru | | | | | |
| 34 | 40 | 4.6155 | 40 | 5.411 | 20 | 0.9583 | 0.2 | 0.017060 |
| 35 | 50 | 5.8785 | 30 | 4.1328 | 20 | 0.9742 | 0.2 | 0.017374 |
| 36 | 60 | 7.1829 | 20 | 2.807 | 20 | 0.9935 | 0.2 | 0.017700 |

Initiator per sample: 5.5 mg of AIBN

Composition of polymer samples 14-36

EXAMPLE 37

Hydration of the polymer discs

The polymers from Examples 1-36 are cut into discs (diameter: 11.5 to 12 mm, thickness: 0.152 to 0.271 mm) and polished. The diameter $D_p$, the thickness $d_p$ and the weight $G_p$ of the discs are determined. $D_p$ is determined with a lens with measuring divisions, and $d_p$ is determined with a micrometer screw. The polymer discs obtained in this way are stored in aqueous "buffered isotonic sodium chloride solution" (300 mosmol; pH 7.2; 3.04 g of $Na_2HPO_4 \times 2H_2O$, 0.84 g of $NaH_2PO_4 \times H_2O$ and 8.00 g of NaCl per 1 l of solution), which is renewed 2×. All the polymer discs appear crystal clear and are hard after the hydration.

EXAMPLE 38

Hydrolysis of the polymer discs

Based on the method of Tanaka et al. (GB 2091750) the polymer discs from Example 37 are stored in a 50% aqueous formic acid solution at 20° C. for 30 minutes and then in 6N hydrochoric acid at 50° C. for 2 hours to eliminate the isopropylidene protective groups. After the hydrolysis, the discs are placed in 2% aqueous sodium carbonate solution at 20° C. for 15 minutes and then stored in "buffered isotonic sodium chloride solution" (as in Example 37) at room temperature for 10 days, the solution being renewed 2×. Apart from polymer disc No. 8, all the discs are colourless and crystal clear. With the exception of polymers 1, 2, 9, 10 and 12, which are hard, the other polymer discs are soft materials.

The elimination of the isopropylidene protective groups and thus the liberation of the OH groups on the saccharide molecules by 6N HCl at 20° C. was studied in detail. The question of whether, under the stated conditions, cleavage of the ester linkage, via which the saccharide unit is bonded to the polymer framework, takes place was also examined thereby.

It is known [T. Tanaka, Spektrum der Wissenschaft 78 (March 1981)], that hydrogels which contain carboxyl groups have a higher water content and a greater linear expansion when transferred from aqueous salt solution into distilled water. Accordingly, the values for the water content and linear expansion ought to increase when the polymer discs are transferred from "buffered isotonic sodium chloride solution" into distilled water. In addition, the IR spectra of these samples (washed salt-free and then dried) ought to contain absorptions for carboxyl and, possible also, carboxylate groups if ester cleavage has taken place to a considerable extent (sensitivity of IR spectroscopy) during the elimination of protective groups.

Samples nos. 8, 9, 11 and 13 show such an increase in the linear expansion and the IR absorptions typical of carboxyl groups in the region from 2500 to 2700 cm$^{-1}$ and at 1570 cm$^{-1}$, whereas the band at 3000 cm$^{-1}$ cannot be evaluated with certainty owing to the strong $CH_2$ band at 2490 cm$^{-1}$ and the very strong and broad OH band at 3400 cm$^{-1}$. Neither an increase in the linear expansion nor the occurrence of IR bands characteristic of carboxyl or carboxylate groups was found for polymer samples nos. 1-7, 10 and 12.

The conclusion to be drawn from this is that an ester cleavage of this type occurs with acrylic esters with saccharide units, whereas it is not observed in the case of methacrylates under the hydrolysis conditions employed here.

EXAMPLE 39

Water content and linear swelling of the hydrated polymer discs (unhydrolysed)

Unhydrolysed polymer discs from the previous examples are examined for their water content (H) at 35° C. after swelling in "buffered isotonic sodium chloride solution" and for their linear expansion (LE). The values determined are compiled in Table 2. Both the water content and the linear expansion are overall very low for polymer samples 1-7, and they decrease as the proportion of F7BuMA and of the protected 5-MDPXy increases, which is attributable to the hydrophobic nature of both these monomers. The same applies to polymer samples 8-13, in which the water content is below 2% throughout and the linear expansion is virtually zero.

TABLE 2

| Polymer of Example | H[%] at 35° C. | LE[%] at 35° C. |
|---|---|---|
| 1 | 7 | 3 |
| 2 | 4 | 1 |
| 3 | 3 | <1 |
| 4 | 2 | <1 |
| 5 | 1 | <1 |
| 6 | <1 | <1 |
| 7 | <1 | <1 |
| 8-13 | <2 | ~0 |
| 14 | 17.33 | |
| 15 | 2.19 | |
| 16 | 1.83 | |
| 17 | 1.45 | |
| 18 | 1.25 | |
| 19 | 0.83 | |
| 20 | 0.62 | |
| 21 | — | |
| 22 | 1.92 | |
| 23 | 1.49 | |
| 24 | 1.04 | |
| 25 | 0.98 | |
| 26 | 0.92 | |
| 27 | 0.61 | |
| 28 | 2.39 | |
| 29 | 1.50 | |
| 30 | 1.42 | |
| 31 | 1.40 | |
| 32 | 1.20 | |

TABLE 2-continued

| Polymer of Example | H[%] at 35° C. | LE[%] at 35° C. |
|---|---|---|
| 33 | 1.58 | |
| 34 | 1.32 | |
| 35 | 1.23 | |
| 36 | 1.54 | |

EXAMPLE 40

Water content and linear expansion of the hydrolysed and swollen polymer samples Table 3 which follows shows the values for the water content and the linear expansion of the hydrolysed polymer samples, in which the isopropylidene protective groups on the 5-MDPXy units (or analogous units) are eliminated. Polymer samples with comparable contents of VP in place of 5-MDPXy have lower values for the water content and the linear expansion. The values for the water content are also given for commercially available lenses W 38 and WCE.

TABLE 3

| Polymer of Example | H [%] at 35° C. | LE [%] at 35° C. |
|---|---|---|
| 1 | 20 | 7 |
| 2 | 31 | 12 |
| 3 | 42 | 17.5 |
| 4 | 50 | 23.0 |
| 5 | 54 | 27.0 |
| 6 | 57 | 29.5 |
| 7 | 59 | 30.0 |
| 8 | 45 | 20.0 |
| 9 | 40 | |
| 10 | 25 | |
| 11 | 42 | 17.0 |
| 12 | 35 | |
| 13 | 45 | 19.0 |
| 14 | 79.2 | 62.6 |
| 15 | 66.4 | 40.7 |
| 16 | 40.4 | 16.9 |
| 17 | 24.3 | 5.1 |
| 18 | 14.3 | 2.7 |
| 19 | 4.4 | 1.7 |
| 20 | 1.6 | 0.0 |
| 21 | 89.0 | 48.7 |
| 22 | 66.9 | 28.7 |
| 23 | 27.6 | 0.9 |
| 24 | 15.0 | 0.9 |

TABLE 3-continued

| Polymer of Example | H [%] at 35° C. | LE [%] at 35° C. |
|---|---|---|
| 25 | 12.4 | 0.0 |
| 26 | 6.5 | 0.0 |
| 27 | 1.6 | 0.0 |
| 28 | 67.5 | 21.4 |
| 29 | 52.5 | 12.2 |
| 30 | 30.9 | 4.2 |
| 31 | 10.0 | 1.3 |
| 32 | 5.1 | 0.8 |
| 33 | 6.2 | 0.8 |
| 34 | 48.0 | 12.2 |
| 35 | 27.8 | 5.5 |
| 36 | 10.4 | 5.0 |
| W38 | 38 | |
| WCE | 57 | |

EXAMPLE 41

Determination of the oxygen permeability

The measurement is carried out with a Createch Permeometer, model 201 [1032 Neilson St., California 94706) with an Ag anode and Pt cathode by the method of J. Fatt (Am. J. Optom. and Physiol. Optics, 48, 545 (1971)] at 35° C. The electrodes are positioned in a Plexiglass holder. The humidity during the measurements is above 90%.

The values for the oxygen permeability of the hydrated and hydrolysed polymer discs nos. 1-13 are indicated in Table 4a-expressed as permeation coefficient $P_{O_2}$, transmissibility $T_{O_2}$ and oxygen flux $J_{O_2}$. For the purposes of comparison, the values for two commercially available hydrogel materials (W 38=PolyHEMA crosslinked with EGDM, WCE=copolymer of VP and methyl methacrylate, both Titmus Eurocon GmbH) are included.

Table 4b contains the $P_{O_2}$, $T_{O_2}$ and $J_{O_2}$ values for the hydrated polymer samples nos. 14-20, 22, 23 and 29-36. The saccharide units in these hydrated polymer samples (with water contents which are generally below 2%, see Tab. 2) are in the hydrophobic form with isopropylidene protective groups and contribute only slightly to the oxygen permeability.

Table 4c contains the values for the oxygen permeability for the hydrolysed polymer samples nos. 14-36 (hydrogels).

TABLE 4a

| Polymer of Example No. (hydrated) | (hydrolysed) | $P_{O_2} 10^{-11}$ $\left[\frac{ml(O_2) \cdot cm^2}{ml \cdot s \cdot mm(Hg)}\right]$ | $T_{O_2} 10^{-9}$ $\left[\frac{ml(O_2)}{cm^2 \cdot s \cdot mm(Hg)}\right]$ | $J_{O_2}$ $\left[\frac{\mu l(O_2)}{cm^2 \cdot h}\right]$ |
|---|---|---|---|---|
| 1 | | 4.2 | 1.1 | 0.6 |
| 4 | | 3.8 | 1.3 | 0.7 |
| 5 | | 3.4 | 1.2 | 0.7 |
| | 1 | 6.8 | 2.6 | 1.5 |
| | 2 | 11.9 | 5.5 | 3.1 |
| | 3 | 17.9 | 7.3 | 4.1 |
| | 4 | 22.8 | 8.4 | 4.7 |
| | 5 | 26.4 | 9.3 | 5.2 |
| | 6 | 28.5 | 11.9 | 6.6 |
| | 7 | 32.0 | 13.9 | 7.8 |
| | 8 | 20.9 | 8.1 | 4.5 |
| | 9 | 18.1 | 7.9 | 4.4 |
| | 10 | 9.3 | 4.4 | 2.5 |
| | 11 | 17.3 | 9.7 | 5.4 |
| | 12 | 16.1 | 6.7 | 3.7 |
| | 13 | 20.1 | 9.1 | 5.1 |
| W38 | | 8.3 | 4.4 | 2.5 |
| WCE | | 22.9 | 10.9 | 6.1 |

TABLE 4b

| Sample No. | $P_{O_2} \, 10^{-11}$ $\left[\dfrac{ml(O_2) \cdot cm^2}{ml \cdot s \cdot mm(Hg)}\right]$ | $T_{O_2} \, 10^{-9}$ $\left[\dfrac{ml(O_2)}{cm^2 \cdot s \cdot mm(Hg)}\right]$ | $J_{O_2}$ $\left[\dfrac{\mu l(O_2)}{cm^2 \cdot h}\right]$ |
|---|---|---|---|
| 14 | 5.11 | 3.01 | 1.68 |
| 15 | 8.34 | 3.9 | 2.18 |
| 16 | 12.68 | 5.03 | 2.80 |
| 17 | 11.86 | 6.27 | 3.48 |
| 18 | 14.93 | 8.03 | 4.48 |
| 19 | 30.10 | 13.44 | 7.50 |
| 20 | 43.13 | 26.30 | 14.67 |
| 22 | 4.95 | 2.66 | 1.48 |
| 23 | 7.79 | 4.28 | 2.39 |
| 29 | 6.12 | 3.5 | 1.95 |
| 30 | 8.17 | 5.79 | 3.23 |
| 31 | 12.31 | 6.35 | 3.54 |
| 32 | 18.51 | 9.85 | 4.49 |
| 33 | 24.67 | 13.78 | 7.69 |
| 34 | 8.12 | 4.08 | 2.27 |
| 35 | 11.80 | 6.02 | 3.36 |
| 36 | 15.96 | 9.73 | 5.43 |

TABLE 4c

| Sample No. | $P_{O_2} \, 10^{-11}$ $\left[\dfrac{ml(O_2) \cdot cm^2}{ml \cdot s \cdot mm(Hg)}\right]$ | $T_{O_2} \, 10^{-9}$ $\left[\dfrac{ml(O_2)}{cm^2 \cdot s \cdot mm(Hg)}\right]$ | $J_{O_2}$ $\left[\dfrac{\mu l(O_2)}{cm^2 \cdot h}\right]$ |
|---|---|---|---|
| 14 | 41.15 | 19.23 | 10.73 |
| 15 | 32.01 | 14.04 | 7.83 |
| 16 | 22.67 | 7.29 | 4.07 |
| 17 | 16.4 | 6.84 | 3.82 |
| 18 | 16.85 | 7.02 | 3.92 |
| 19 | 20.2 | 8.92 | 9.98 |
| 20 | 29.8 | 16.3 | 9.09 |
| 21 | 40 | 29.85 | 16.66 |
| 22 | 32.08 | 13.77 | 7.68 |
| 23 | 14.99 | 7.31 | 4.08 |
| 24c | (12.37) | (4.78) | (2.72) |
| 25c | (15.6) | (7.04) | (3.93) |
| 26c | (21.7) | (12.6) | (7.03) |
| 27 | 29.8 | 16.3 | 9.09 |
| 28 | 26.09 | 11.7 | 6.53 |
| 29 | 21.32 | 11.34 | 6.32 |
| 30 | 11.11 | 7.17 | 4.00 |
| 31 | 12.57 | 6.7 | 3.73 |
| 32 | 18.05 | 9.35 | 5.21 |
| 33 | 27.53 | 14.27 | 7.96 |
| 34 | 13.5 | 11.34 | 6.32 |
| 35 | 19.9 | 9.9 | 5.52 |
| 36 | 22 | 13.67 | 7.62 |

C samples: hydrolysed for only 2 hours

EXAMPLE 42

Ball indentation hardness

The polymer discs from some of the preceding examples are converted into sample cylinders (diameter 130 mm, thickness 4.0 mm) by turning and polishing. The ball indentation hardness K is determined using a Zwick apparatus at 23° C. The sample cylinders of polymer discs nos. 2-7 shattered during the measurement. The K values of the tested polymer discs are compiled in Table 5.

TABLE 5

| Polymer of Example No. | K[N/mm²] after 30 s | K[N/mm²] after 60 s |
|---|---|---|
| 1 | — | 119 |
| 14* | — | — |
| 15* | 127.6 | 122.0 |
| 16* | 112.6 | 106.3 |
| 17 | 112.6 | 106.3 |
| 18 | 101.5 | 97.0 |
| 19 | 84.6 | 79.8 |
| 20 | 81.5 | 77.3 |
| 21 | 182.0 | 174.0 |
| 22 | 173.5 | 166.4 |
| 23 | 153.1 | 147.2 |
| 24 | 143.0 | 136.7 |
| 25 | 124.0 | 112.6 |
| 26 | 96.0 | 92.3 |
| 27 | 81.5 | 77.3 |
| 28* | — | 159.5 |
| 29* | — | 153.1 |
| 30* | — | 147.2 |
| 31** | 132.0 | 127.6 |
| 32 | 127.6 | 112.6 |
| 33 | 106.3 | 100.7 |
| 34 | 127.6 | 123.5 |
| 35 | 116.0 | 109.4 |

TABLE 5-continued

| Polymer of Example No. | K[N/mm²] after 30 s | after 60 s |
|---|---|---|
| 36 | 103.5 | 98.2 |

*Samples broken up:
14 before the measurement
15 and 16 after the measurement
28 to 30 after 60 s
**A crack in the middle after the measurement

What is claimed is:

1. An ophthalmic device comprising a hydrogel which is a copolymer of a polymerizable monomer mixture which contains a) 2–85 mol % of a hydrophobic vinyl monomer with at least three flourine atoms,
b) 2–80 mol % of a hydrophobic polyhydroxy vinyl monomer whose hydroxyl groups are in protected form,
c) 2–70 mol % of a hydrophilic vinyl monomer, and
d) based on the total amount of monomers a)–c), 0–5 mol % of a crosslinker, in which hydrogel the hydroxyl groups of the segments formed by the monomers b) are in protected or free form.

2. The ophthalmic device of claim 1, wherein the device is a contact lens.

3. The ophthalmic device of claim 1, wherein the device is an intraocular lens.

* * * * *

UNITED STATES PATENT AND TRADEMARK OFFICE
CERTIFICATE OF CORRECTION

PATENT NO.  : 5,214,452
DATED       : May 25, 1993
INVENTOR(S) : KOSSMEHL, G., et al.

It is certified that error appears in the above-identified patent and that said Letters Patent is hereby corrected as shown below:

Title page:

Item [30] should read:

-- Foreign Application Priority Data

Dec. 19, 1988 [DE] Rep. of Germany   3842752.--

Signed and Sealed this

Third Day of May, 1994

Attest:

BRUCE LEHMAN

*Attesting Officer*     Commissioner of Patents and Trademarks